(12) United States Patent
Franz et al.

(10) Patent No.: US 10,773,201 B2
(45) Date of Patent: Sep. 15, 2020

(54) ANNULAR FILTER ELEMENT, IN PARTICULAR FOR GAS FILTRATION

(71) Applicant: MANN+HUMMEL GmbH, Ludwigsburg (DE)

(72) Inventors: Andreas Franz, Ludwigsburg (DE); Torsten Fritzsching, Vaihingen (DE); Nadine Donauer, Fellbach (DE); Marcel Holzwarth, Fayetteville, NC (US); Pedro Miguel Pereira Madeira, Bietigheim-Bissingen (DE); Christoph Wittmers, Bietigheim-Bissingen (DE); Manfred Winter, Bad Rappenau (DE); Joachim-Paul Krieger, Reisbach (DE); Martin Gruber, Gangkofen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 35 days.

(21) Appl. No.: 16/179,147

(22) Filed: Nov. 2, 2018

(65) Prior Publication Data

US 2019/0070548 A1    Mar. 7, 2019

Related U.S. Application Data

(63) Continuation of application No. PCT/EP2017/055315, filed on Mar. 7, 2017.

(30) Foreign Application Priority Data

May 3, 2016 (DE) .................. 10 2016 005 352

(51) Int. Cl.
*B01D 46/24* (2006.01)
*B01D 29/19* (2006.01)
*B01D 46/00* (2006.01)

(52) U.S. Cl.
CPC .......... *B01D 46/2411* (2013.01); *B01D 29/19* (2013.01); *B01D 46/0005* (2013.01);
(Continued)

(58) Field of Classification Search
CPC ............ B01D 46/0005; B01D 46/2411; B01D 46/2414; B01D 2271/025; B01D 2271/027; B01D 2275/208
See application file for complete search history.

(56) References Cited

U.S. PATENT DOCUMENTS

2015/0101299 A1*  4/2015  Osendorf ........... B01D 46/2414
                                                55/502

FOREIGN PATENT DOCUMENTS

DE    202006014784 U1    2/2008
DE    102007017091 A1    10/2008
(Continued)

*Primary Examiner* — Robert Clemente
(74) *Attorney, Agent, or Firm* — James Hasselbeck

(57) ABSTRACT

An annular filter element has a filter medium body configured to be flowed through by a fluid to be purified in a radial direction. A sealing element is arranged at the end face of the filter medium body and extends circumferentially around the end face. The sealing element has at least one first sealing section comprising a massive and large cross-sectional area and one or more second sealing sections with a cross-sectional area that is at least partially reduced in comparison to the large cross-sectional area. The one or more second sealing sections include a second sealing section with a groove-type recess, wherein the groove-type recess extends at least approximately across a length of the second sealing section with the groove-type recess or across a portion of said length.

9 Claims, 2 Drawing Sheets

(52) U.S. Cl.
CPC .... *B01D 46/2414* (2013.01); *B01D 2271/025* (2013.01); *B01D 2271/027* (2013.01); *B01D 2275/208* (2013.01)

(56) References Cited

FOREIGN PATENT DOCUMENTS

| | | |
|---|---|---|
| DE | 112008002433 A5 | 9/2010 |
| DE | 102011078057 A1 | 1/2013 |
| DE | 102013020384 A1 | 6/2014 |
| DE | 102014006850 A1 | 12/2014 |
| DE | 102013018201 A1 | 4/2015 |
| EP | 1354617 A1 | 10/2003 |
| EP | 2227307 B1 | 9/2010 |
| EP | 2396102 A1 | 12/2011 |
| EP | 2742986 A1 | 6/2014 |
| EP | 2764904 A1 | 8/2014 |
| EP | 2771092 A2 | 9/2014 |

* cited by examiner

ANNULAR FILTER ELEMENT, IN PARTICULAR FOR GAS FILTRATION

CROSS-REFERENCE TO RELATED APPLICATIONS

This application is a continuation application of international application No. PCT/EP2017/055315 having an international filing date of 7 Mar. 2017 and designating the United States, the international application claiming a priority date of 3 May 2016 based on prior filed German patent application No. 10 2016 005 352.6, the entire contents of the aforesaid international application and the aforesaid German patent application being incorporated herein by reference.

BACKGROUND OF THE INVENTION

The invention concerns an annular filter element, in particular for gas filtration, for example, for an air filter, with a filter medium body which can be flowed through by the fluid to be purified in radial direction.

DE 10 2007 017 091 A1 discloses an annular filter element for an air filter of an internal combustion engine that comprises an annular filter medium body which is flowed through by the air to be purified in radial direction from the exterior to the interior. The interior in the filter medium body, which is lined by a central tube, forms the clean chamber from which the purified air is discharged axially. The central tube is provided in the region of an axial end face with a support collar which is extending in radial direction outwardly and which is resting on an end disk of the filter medium body. The support collar comprises an axially projecting annularly extending section which is enveloped by a sealing material. In the inserted state in the receiving filter housing, a housing cover is supported at the sealing element at the support collar of the filter element.

SUMMARY OF THE INVENTION

It is the object of the invention to configure an annular filter element with simple constructive measures in such a way that seal-tightness between raw side and clean side is ensured over an extended period of operation.

This object is solved according to the invention in that at the end face of the filter medium body a circumferentially extending sealing element is arranged that comprises at least one sealing section with massive and larger cross-sectional area and at least one additional sealing section with at least partially reduced cross-sectional area, wherein at least one sealing section with reduced cross-sectional area comprises a groove-type recess that extends at least approximately across the length or across a portion of the length of the sealing section with reduced cross-sectional area. The dependent claims provide expedient further embodiments.

The filter element according to the invention is of an annular configuration and is flowed through radially by the fluid to be purified. The annular shape of the filter element encompasses circular, oval and ovalized basic cross sections as well as elongate oval or rectangular cross sections with curved narrow sides, for example, in the form of semicircles, wherein the longitudinal sides can be straight or curved convexly or concavely. The annular filter element surrounds an interior which adjoins the clean side of a filter medium body of the filter element at which the filtration of the fluid takes place. The purified fluid is discharged from the interior in axial direction of the filter element.

The annular filter element is preferably used for gas filtration, for example, as an air filter for internal combustion engines. However, a use for filtration of liquids is conceivable also.

At the end face of the filter medium body of the filter element, a circumferentially extending sealing element is arranged which separates flow-tightly the raw side from the clean side in the mounted state of the filter element. The filter device to which the filter element belongs comprises a filter housing for receiving the filter element, wherein the filter element is insertable into the housing component and the sealing element is supported at the housing component.

As needed, the inner side of the filter medium body can be lined by a central tube forming a support frame.

The circumferentially extending sealing element at the end face of the filter medium body comprises at least two sealing sections that differ from each other in regard to their cross-sectional area and optionally also in regard to their cross-sectional geometry. At least one sealing section comprises a massively embodied larger cross-sectional area and at least one additional sealing section comprises an at least partially reduced cross-sectional area which is embodied with a smaller size in comparison to the first sealing section. This configuration has the advantage that different loads on the sealing element can be taken into account by means of the different cross-sectional areas. For example, it is possible in particular to provide a reduced cross-sectional area at sealing sections with reduced tension and a larger cross-sectional area at sealing sections with greater tension.

Advantageously, the sealing section with the reduced cross-sectional area comprises a greater length than the sealing section with the larger cross-sectional area. In particular in case of a non-round cross-sectional shape of the filter element and of the filter medium body, for example, in case of extremely oval cross-sectional shapes or rectangular cross-sectional shapes with rounded narrow sides, the two longitudinal sides have advantageously a reduced cross-sectional area and the narrow sides, which are provided with a relatively great bend, have in comparison a larger cross-sectional area. The narrow sides comprise a higher inherent tension than the longitudinal sides, wherein the longitudinal sides advantageously are engaged and laterally supported in the mounted state by a housing component of the filter device for stabilization.

In a preferred embodiment, in case of an oval or rectangular embodiment with two longitudinal sides and two narrow sides connecting the two longitudinal sides, the filter element comprises respectively two sealing sections with larger cross-sectional area and two sealing sections with reduced cross-sectional area in comparison to the larger cross-sectional area, wherein the sealing sections with reduced cross-sectional area are extending at the longitudinal sides and the sealing sections with larger cross-sectional area at the narrow sides. The curved narrow sides have a shorter length than the longitudinal sides with reduced curvature or no curvature and have a higher inherent stability.

According to the invention, the sealing section with reduced cross-sectional area has a groove-type recess that extends at least approximately across the length of this sealing section. The groove serves for receiving a support rib which is arranged at the inner side of the housing component into which the filter element is insertable. This support rib stabilizes the sealing section with reduced cross-sectional area and keeps it in its nominal position. It is also possible to have at the housing component several support ribs which, for example, may extend only across a small longitudinal section of the sealing section.

According to a further advantageous embodiment, at the sealing wall which delimits the groove-type recess, a sealing bead is provided which projects inwardly into the groove-type recess. In the mounted state, the support rib is positioned in the groove-type recess and pushes against the sealing bead so that in transverse direction—transverse to the longitudinal extension of the sealing section—an increased sealing force and improved seal-tightness are obtained.

According to a further advantageous embodiment, the sealing section with reduced cross-sectional area has several recesses in sequence. They can be separated from each other. Optionally, one support rib of the housing component to be attached can project into the individual recesses, respectively.

According to yet another embodiment, at least one sealing section with reduced cross-sectional area has a massively embodied but tapering cross section without groove or recess. With this embodiment, the sealing section with larger cross-sectional area as well as the sealing section with reduced cross-sectional area are of a massive configuration. The sealing section with tapering cross section can be embraced in an advantageous way at one or both lateral surfaces by the housing component to be attached.

The housing component, into which the filter element is inserted and where the sealing element is axially supported, advantageously rests with at least one wall side laterally at a sealing wall of the sealing section with reduced sealing cross section. In this way, in transverse direction—transverse to the longitudinal extension of the sealing element—a support action of the sealing element in the section with reduced cross-sectional area is achieved. Advantageously, only the inwardly positioned sealing wall is resting against the supporting housing component while the outwardly positioned sealing wall of the sealing section with reduced sealing cross section exhibits clearance relative to the housing component. This embodiment reduces the forces when inserting the filter element into the housing component and prevents an uncontrollable deformation of the sealing element.

BRIEF DESCRIPTION OF THE DRAWINGS

Further advantages and expedient embodiments can be taken from the additional claims, the figure description, and the drawings.

In the Figures, same components are provided with same reference characters.

DESCRIPTION OF PREFERRED EMBODIMENTS

Figure 1:
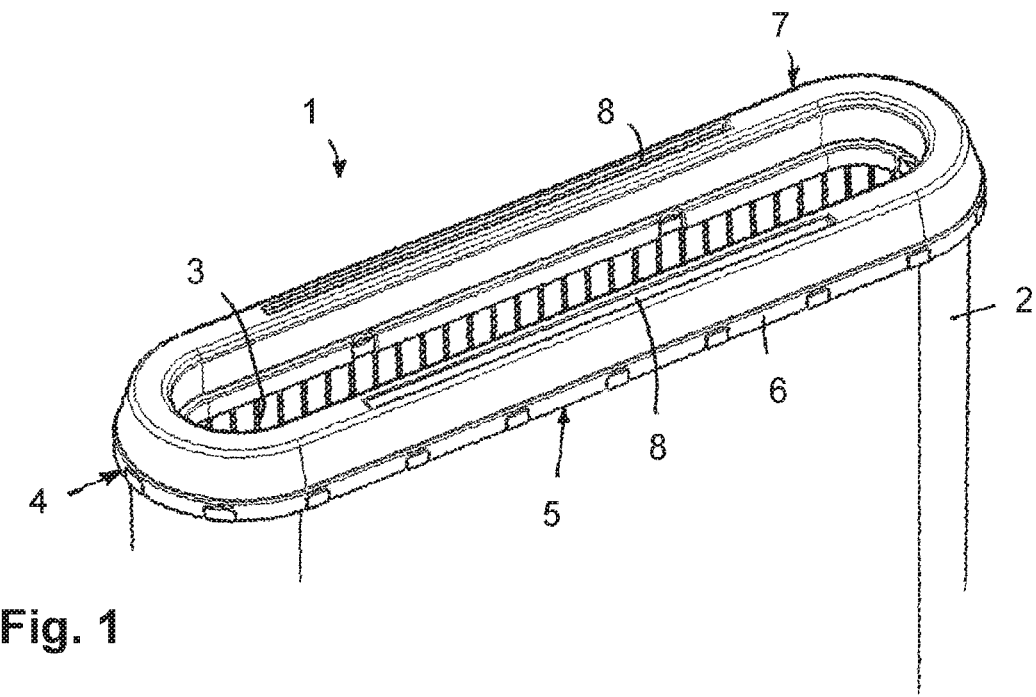
FIG. 1 shows in a perspective view an annular filter element with a filter medium body which at one end face is provided with a circumferentially extending sealing element which is massive and provided with larger cross-sectional area at its part-circular curved narrow sides and provided with groove-type recesses and reduced cross-sectional area at its longitudinal sides.

In FIG. 1, a filter element 1 is illustrated that preferably serves for gas filtration, for example, for an air filter in the intake manifold of an internal combustion engine. The filter element 1 comprises an annular filter medium body 2 where the filtration of the gas takes place and that is flowed through in radial direction from the exterior to the interior by the gas. Correspondingly, the interior in the filter medium body provides the clean chamber for receiving the purified gas which is axially discharged.

The inner side of the filter medium body 2 is lined by a support frame 3 which is preferably comprised of plastic material and comprises longitudinal and transverse webs. The support frame 3 stabilizes the filter medium body 2.

The filter element 1 with the filter medium body 2 is of an annular configuration; it comprises a greatly ovalized or rectangular cross-sectional shape with narrow sides 4 that are curved semi-circularly and with straight longitudinal sides 5. Oval configurations are conceivable also in which the longitudinal sides 5 are curved convexly in outward direction but have a smaller curvature than the narrow sides 4.

The end face of the filter medium body 2 is covered by an annular end disk 6 which is a carrier of a circumferentially extending sealing element 7. The sealing element 7 can be injection molded onto the end disk 6, foamed on, applied as a sealing bead or produced in another way. In the mounted state in the filter device, the sealing element 7 is loaded axially by a housing cover attachable atop the filter housing, which is not illustrated figuratively because the housing cover can be located, for example, at the end of the filter housing that is facing away.

The sealing element 7 is located advantageously at the clean side of the filter element 1 through which the purified fluid is discharged axially from the interior in the filter medium body 2.

At both longitudinal sides 5, a groove-type recess 8 is introduced into the sealing element 7. The groove-type recess 8 is located at the axial end face of the sealing element and extends approximately across the length of the longitudinal side 5.

The narrow sides 4 are of a massive configuration; they have no groove-type recesses like the longitudinal sides 5. In other respects, the sealing sections in the region of the narrow sides and the sealing sections in the region of the longitudinal sides have the same cross-sectional shape. In the region of the longitudinal sides, the cross-sectional area, due to the groove-type recess 8, is reduced relative to the cross-sectional area at the narrow sides.

The end disk 6 and the sealing element 7 can be embodied as a single piece, as needed.

Figure 2:
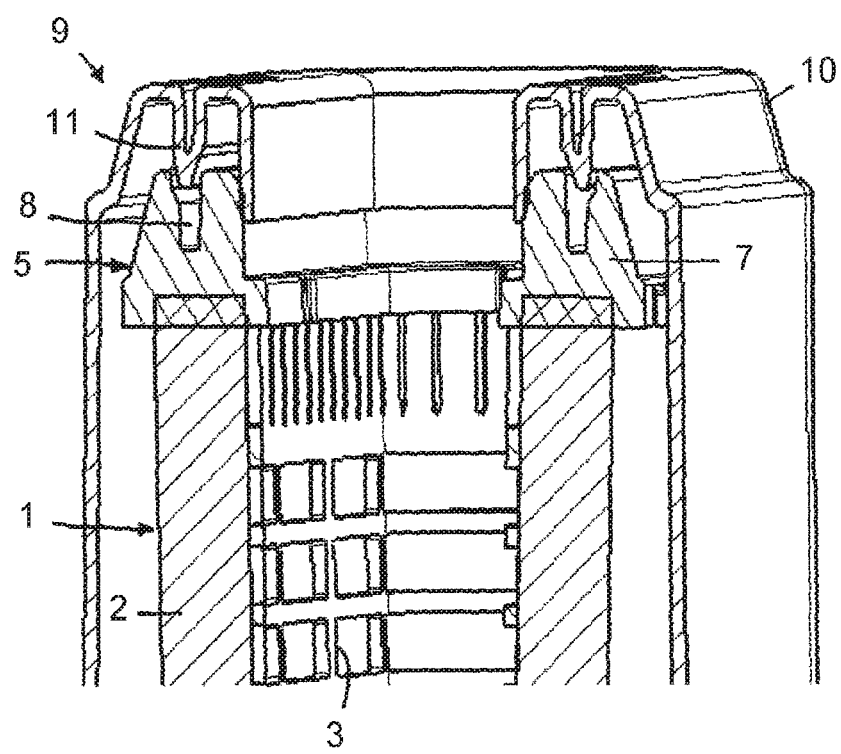
FIG. 2 shows a section lengthwise through a filter device with the filter element, inserted into a filter housing that comprises at its inner side a support rib which is insertable into the groove-type recess in the sealing element.
Figure 3:
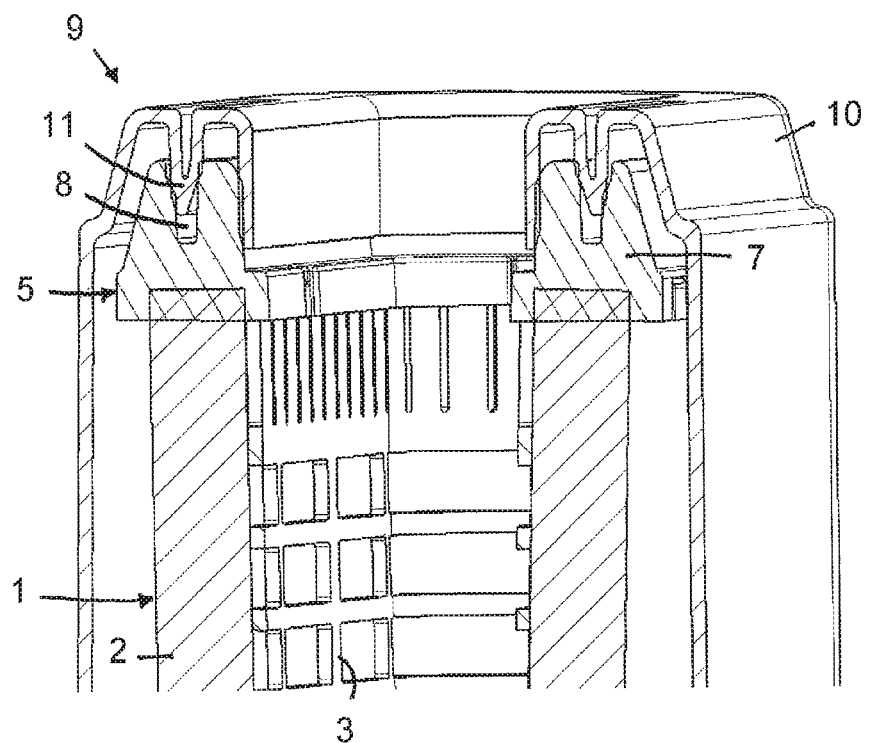
FIG. 3 shows an illustration corresponding to FIG. 2 but in an approaching position of support rib and sealing element.
Figure 4:
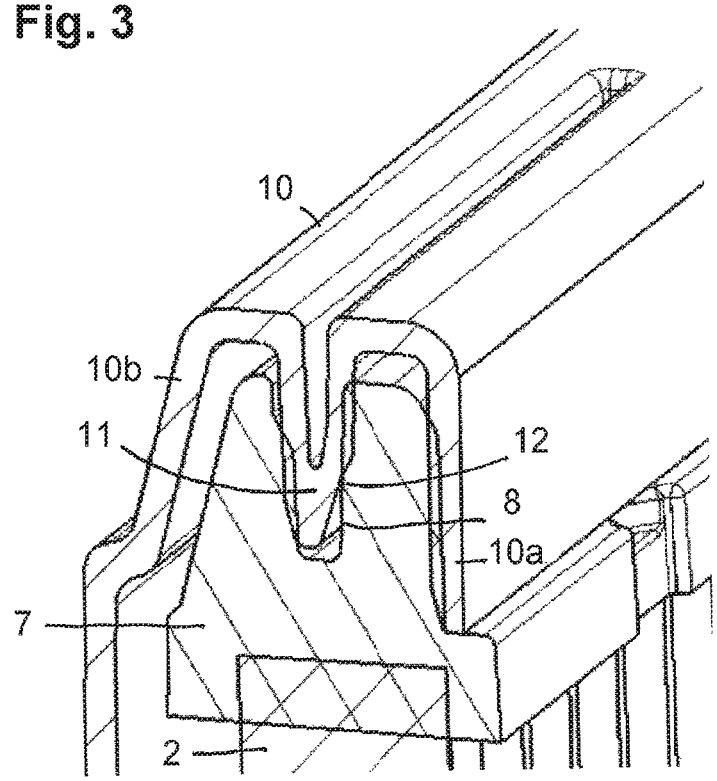
FIG. 4 shows in enlarged detail illustration a section of the sealing element and the completely inserted support rib of the housing component.

In FIGS. 2 to 4, the filter device 9 with filter element 1 is illustrated which is inserted into a filter housing. At an end of the filter housing which is facing away from the support rib 11, the filter housing can be closed off with a cover which is not illustrated figuratively. At the inner side of the housing component 10, an inwardly projecting support rib 11 is integrally formed which is insertable into the groove-type recess 8 in the sealing element 7 in the region of the longitudinal sides 5. At the inner side of the housing component 10, the support rib 11 extends in accordance with the embodiment of the groove-type recess 8 in the sealing element 7 only along the longitudinal sides but not along the narrow sides. FIG. 2 shows the housing component 10 at the beginning of the insertion process of the support rib 11 into the groove-type recess 8, FIG. 3 in the partially inserted state, and FIG. 4 in the completely inserted state.

The support rib 11 divides the inner side of the housing component 10 in the region in which the sealing element 7 is inserted into two radially neighboring chambers which engage each a sealing wall of the sealing element, wherein the two sealing walls are separated by the groove-type recess 8. As can be seen in particular in FIG. 4, at the exterior side of the inwardly positioned sealing wall at the side which is facing the groove-type recess 8, a sealing bead 12 is integrally formed which is extending in the direction of the groove-type recess 8 and against which the support rib 11 of the housing component 10 is resting. The sealing bead 12 projects in transverse direction into the groove-type recess 8 and is loaded by the support rib 11 correspondingly in transverse direction so that an increased sealing action is provided. The inwardly positioned sealing wall is loaded also at its inwardly positioned side by a wall 10a of the housing component 10. On the other hand, the outwardly positioned wall 10b of the housing component 10 is positioned at a spacing to the exterior side of the outwardly positioned sealing wall. Due to this configuration, it is ensured that the forces acting in axial and in transverse direction on the sealing element 7 during insertion into the housing component 10 do not cause impermissible deformation of the sealing element 7.

The inwardly positioned wall 10a of the housing component 10 loads the sealing element 7 also at the narrow side. In contrast thereto, the outwardly positioned wall 10b of the housing part 10 is positioned relative to the narrow side also at a spacing to the sealing element 7.

What is claimed is:

1. An annular filter element comprising:
a filter medium body configured to be flowed through by a fluid to be purified in a radial direction and comprising an end face;
a sealing element arranged at the end face of the filter medium body and extending circumferentially around the end face;
the sealing element comprising
at least one first sealing section comprising
a massive and larger cross-sectional area and
one or more second sealing sections comprising
a cross-sectional area that is at least partially reduced in comparison to the larger cross-sectional area;
wherein the one or more second sealing sections include
a second sealing section with a groove-type recess,
wherein the groove-type recess extends at least approximately across a length of the second sealing section with the groove-type recess or across a portion of said length;
wherein the filter medium body has an elongate shape comprising
longitudinal sides and
narrow sides connecting the longitudinal sides to each other,
wherein the at least one first sealing section extends along the narrow sides and the one or more second sealing sections extend along the longitudinal sides.

2. The annular filter element according to claim 1, wherein the one or more second sealing sections have a greater length than the at least one first sealing section.

3. The annular filter element according to claim 1, wherein
the filter medium body has an oval or ovalized shape.

4. The annular filter element according to claim 1, wherein
the filter medium body has a rectangular shape with curved narrow sides.

5. The annular filter element according to claim 1, wherein
the groove-type recess is delimited by at least one sealing wall and
the at least one sealing wall comprises a sealing bead.

6. The annular filter element according to claim 1, wherein
the groove-type recess is comprised of
several sequentially arranged recesses.

7. The annular filter element according to claim 1, wherein
the one or more second sealing sections include
a second sealing section with a tapering cross section without a groove or a recess.

8. A filter device comprising:
an annular filter element comprising
a filter medium body configured to be flowed through by a fluid to be purified in a radial direction and comprising an end face,
wherein the annular filter element further comprises
a sealing element arranged at the end face of the filter medium body and extending circumferentially around the end face;
wherein the sealing element comprises
at least one first sealing section comprising
a massive and larger cross-sectional area and
one or more second sealing sections comprising a cross-sectional area that is at least partially reduced in comparison to the larger cross-sectional area;
wherein the one or more second sealing sections include
a second sealing section with a groove-type recess,
wherein the groove-type recess extends at least approximately across a length of the second sealing section with the groove-type recess or across a portion of said length;
wherein the filter medium body has an elongate shape comprising
longitudinal sides and
narrow sides connecting the longitudinal sides to each other,
wherein the at least one first sealing section extends along the narrow sides and
the one or more second sealing sections extend along the longitudinal sides; and
a filter housing configured to receive the annular filter element,
wherein the sealing element is supported at a housing component of the filter housing, when the annular filter element is inserted in the filter housing.

9. The filter device according to claim 8, wherein
the housing component supports the one or more second sealing sections at least in sections transverse to a longitudinal extension of the sealing element.

* * * * *